(12) United States Patent
McGrew et al.

(10) Patent No.: US 11,032,314 B2
(45) Date of Patent: Jun. 8, 2021

(54) TRIGGERING TARGETED SCANNING TO DETECT RATS AND OTHER MALWARE

(71) Applicant: Cisco Technology, Inc., San Jose, CA (US)

(72) Inventors: David McGrew, Poolesville, MD (US); Blake Harrell Anderson, San Jose, CA (US); Julien Thomas Piet, Pibrac (FR)

(73) Assignee: Cisco Technology, Inc., San Jose, CA (US)

( * ) Notice: Subject to any disclaimer, the term of this patent is extended or adjusted under 35 U.S.C. 154(b) by 157 days.

(21) Appl. No.: 16/220,115

(22) Filed: Dec. 14, 2018

(65) Prior Publication Data
US 2020/0120107 A1    Apr. 16, 2020

Related U.S. Application Data

(60) Provisional application No. 62/744,888, filed on Oct. 12, 2018.

(51) Int. Cl.
*H04L 29/06* (2006.01)
*G06N 20/00* (2019.01)

(52) U.S. Cl.
CPC .......... *H04L 63/145* (2013.01); *G06N 20/00* (2019.01); *H04L 63/126* (2013.01); *H04L 63/1425* (2013.01); *H04L 63/1408* (2013.01)

(58) Field of Classification Search
CPC ..... H04L 63/14; H04L 63/145; H04L 63/126; H04L 63/1425; H04L 63/1408; H04L 63/1466; H04L 63/1441; H04L 63/1433; H04L 9/002; H04L 9/004; G06N 20/00
See application file for complete search history.

(56) References Cited

U.S. PATENT DOCUMENTS

| 8,291,500 B1 | 10/2012 | Bojaxhi et al. |
| 8,707,440 B2 | 4/2014 | Gula et al. |
| 9,088,606 B2 | 7/2015 | Ranum et al. |

(Continued)

FOREIGN PATENT DOCUMENTS

EP    3306890 A1    4/2018

OTHER PUBLICATIONS

Farinholt, et al., "To Catch a Ratter: Monitoring the Behavior of Amateur DarkComet Rat Operators in the Wild", 2017 IEEE Symposium on Security and Privacy (SP), pp. 770-787, 2017, IEEE.

(Continued)

*Primary Examiner* — Kristine L Kincaid
*Assistant Examiner* — Shaqueal D Wade
(74) *Attorney, Agent, or Firm* — Behmke Innovation Group LLC; Kenneth J. Heywood; James J. Wong

(57) ABSTRACT

In one embodiment, a security service classifies traffic telemetry data for traffic between an endpoint device and a server as potentially associated with a particular type of remote access Trojan (RAT). The security service constructs a scan message to elicit a type of server response associated with the particular type of RAT. The security service obtains a server response from the server, by sending the constructed scan message to the server. The security service determines whether the endpoint device is infected with the particular type of RAT, by validating whether the server response from the server matches the type of server response associated with the particular type of RAT.

17 Claims, 11 Drawing Sheets

(56) References Cited

U.S. PATENT DOCUMENTS

| | | | |
|---|---|---|---|
| 9,690,915 B2 | 6/2017 | Turgeman et al. | |
| 9,961,093 B1 | 5/2018 | Wittenstein | |
| 9,992,225 B2 | 6/2018 | Kolton et al. | |
| 10,701,086 B1* | 6/2020 | Mushtaq | H04L 47/2483 |
| 2012/0278886 A1* | 11/2012 | Luna | G06F 21/552 |
| | | | 726/22 |
| 2015/0356451 A1* | 12/2015 | Gupta | G06F 21/552 |
| | | | 706/52 |
| 2016/0253498 A1* | 9/2016 | Valencia | G06F 21/577 |
| | | | 726/23 |
| 2017/0289185 A1 | 10/2017 | Mandyam | |
| 2020/0053111 A1* | 2/2020 | Jakobsson | H04L 63/30 |

OTHER PUBLICATIONS

Cimpanu, Catalin., "New Shodan Tool Can Find Malware Command and Control (C&C) Servers", https://www.bleepingcomputer.com/news/security/new-shodan-tool-can-find-malware-command-and-control-candc-servers/, 2 pages, Accessed on Aug. 15, 2018, bleepingcomputer.com.

DiskBoss Enterprise 7.4.28—'GET' Remote Buffer Overflow; https://www.exploit-db.com/exploits/40869/; pp. 1-2.

PowerShell Empire | Building an Empire with PowerShell; https://www.powershellempire.com/; pp. 1-3.

Malware Hunter; https://malware-hunter.shodan.io/; pp. 1-2.

Metasploit | Penetration Testing Software, Pen Testing Security | Metasploit; https://www.metasploit.com/; pp. 1-5.

GitHub—n1nj4sec/pupy: Pupy is an opensource, cross-platform (Window . . . ); https://github.com/n1nj4sec/pupy; pp. 1-3.

RealVNCÂ®—Remote access software for desktop and mobile | RealVNC; https://www.realvnc.com/en/; pp. 1-3.

Anderson et al. "Identifying Encrypted Malware Traffic with Contextual Flow Data" Oct. 28, 2016; pp. 1-12.

Anderson et al. "Machine Learning for Encrypted Malware Traffic Classification: Accounting for Noisy Labels and Non-Stationarity" Aug. 2017; pp. 1-9.

Beigi et al. "Towards Effective Feature Selection in Machine Learning-Based Botnet Detection Approaches" 2014 IEEE Conference on Communications and Network Security; 2014; pp. 1-9.

Bilge et al. "DISCLOSURE: Detecting Botnet Command and Control Servers Through Large-Scale NetFlow Analysis" Dec. 3-7, 2012; pp. 1-10.

Celik et al. "Salting Public Traces with Attack Traffic to Test Flow Classifiers" zbc102,jzr148,gik2,djm25 @psu.edu; pp. 1-8.

Farinholt et al. "To Catch a Ratter: Monitoring the Behavior of Amateur DarkComet RAT Operators in the Wild" pp. 1-18.

Gu et al. "BotMiner: Clustering Analysis of Network Traffic for Protocol- and Stru . . . " https://www.usenix.org/legacy/event/sec08/tech/fullpapers/gu/gu_html/ . . . ; pp. 1-16.

Cisco/joy: A package for capturing and analyzing network flow data and i . . . ; https://developer.cisco.com/codeexchange/github/repo/cisco/joy/; pp. 1-3.

Tegeler et al. "BotFinder: Finding Bots in Network Traffic Without Deep Packet Inspection" Dec. 10-13, 2012; pp. 1-12.

Zhongqiang Chen et al.: "Catching Remote Administration Trojans (RATs)", Software Practice & Experience, Wiley & Sons, Bognor Regis, GB, vol. 38, No, 7, Jun. 1, 2008, pp. 667-703.

International Search Report dated Sep. 20, 2019 in connection with PCT/US2019/041967.

* cited by examiner

TRIGGERING TARGETED SCANNING TO DETECT RATS AND OTHER MALWARE

RELATED APPLICATION

This application claims priority to U.S. Provisional Patent Appl. No. 62/744,888, filed on Oct. 8, 2018, entitled "TRIGGERING TARGETED SCANNING TO DETECT RATS AND OTHER MALWARE," by McGrew, et al., the contents of which are incorporated herein by reference.

TECHNICAL FIELD

The present disclosure relates generally to computer networks, and, more particularly, to triggering targeted scanning to detect remote administration Trojans (RATs) and other malware.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic.

Beyond the various types of legitimate application traffic in a network, some network traffic may also be malicious. For example, some traffic may seek to exfiltrate sensitive information from a network, such as credit card numbers, trade secrets, and the like. Further types of malicious network traffic include network traffic that propagate the malware itself and network traffic that passes control commands to already infected devices, such as in the case of remote administration Trojans (RATs).

Inspection of network traffic is relatively straight-forward, when the network traffic is unencrypted. For example, techniques such as deep packet inspection (DPI), allows a networking device to inspect the payloads of packets and identify the contents of the packets. However, the use of traffic encryption is becoming increasingly ubiquitous Many instances of malware now use encryption, to conceal their network activity from detection. Beyond even the case of malware infection, the use of encrypted web traffic is becoming increasingly ubiquitous, making techniques such as DPI unable to identify threats and prevent sensitive data from being communicated elsewhere.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
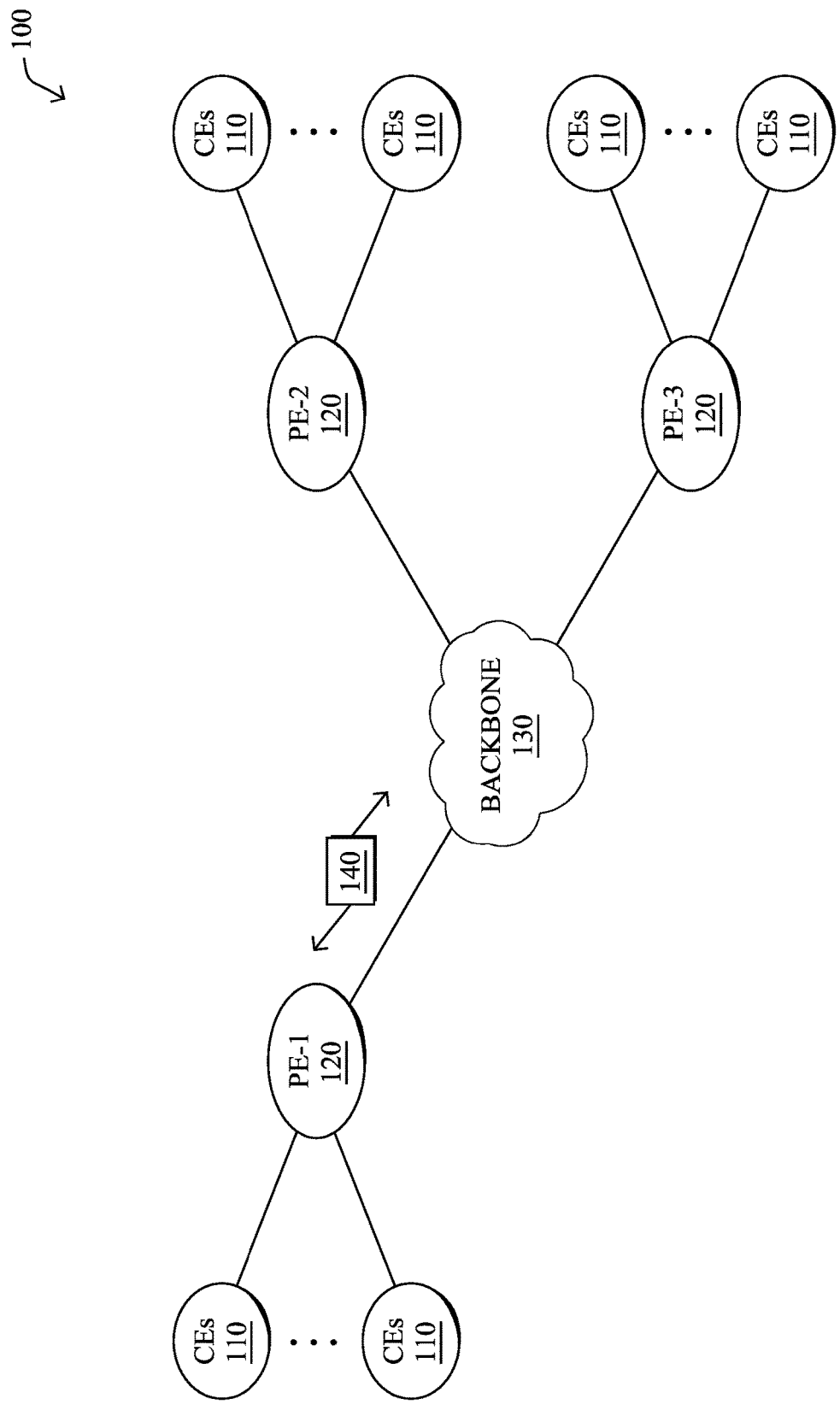
FIGS. 1A-1B illustrate an example communication network.

According to one or more embodiments of the disclosure, a security service classifies traffic telemetry data for traffic between an endpoint device and a server as potentially associated with a particular type of remote access Trojan (RAT). The security service constructs a scan message to elicit a type of server response associated with the particular type of RAT. The security service obtains a server response from the server, by sending the constructed scan message to the server. The security service determines whether the endpoint device is infected with the particular type of RAT, by validating whether the server response from the server matches the type of server response associated with the particular type of RAT.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
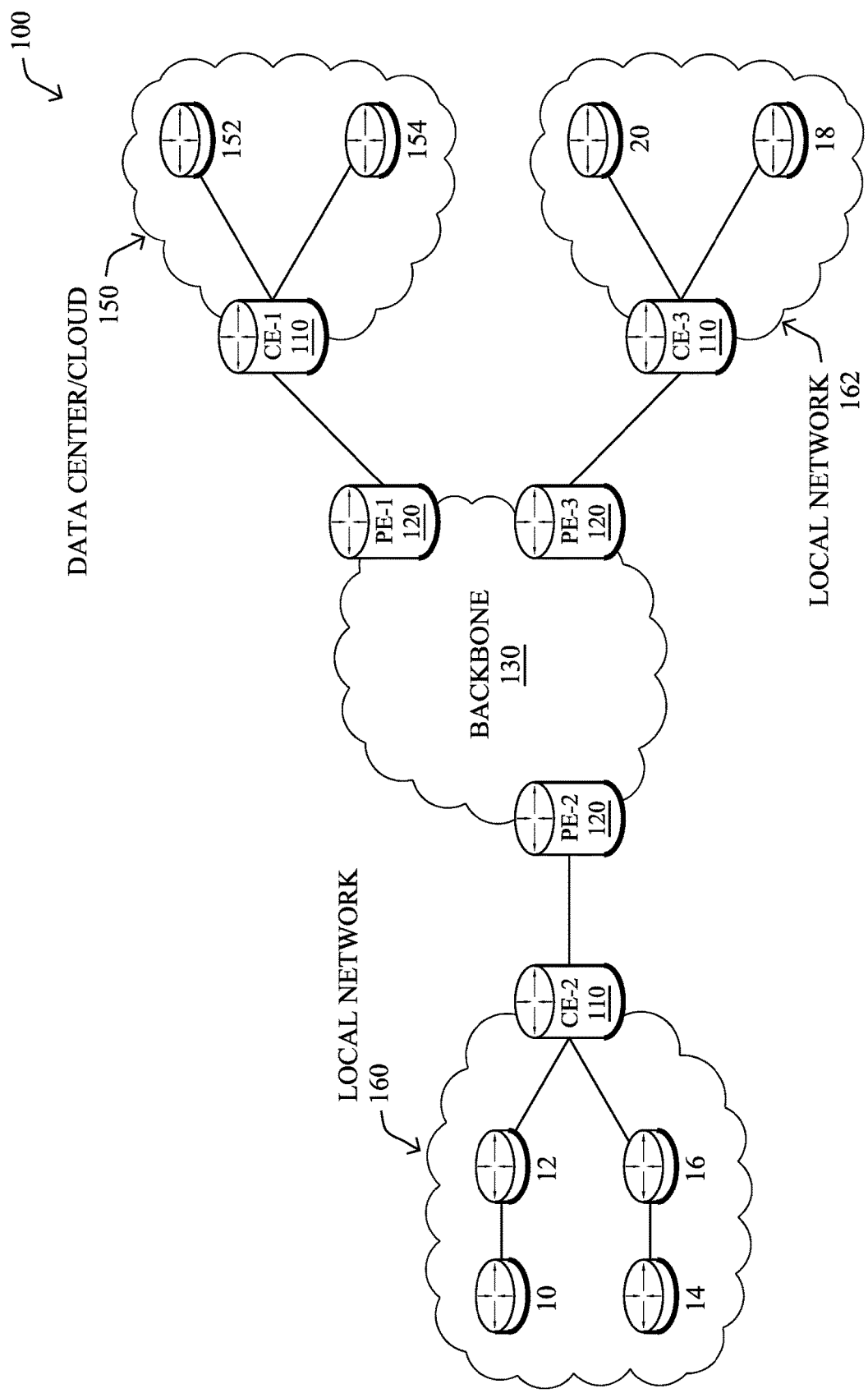

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
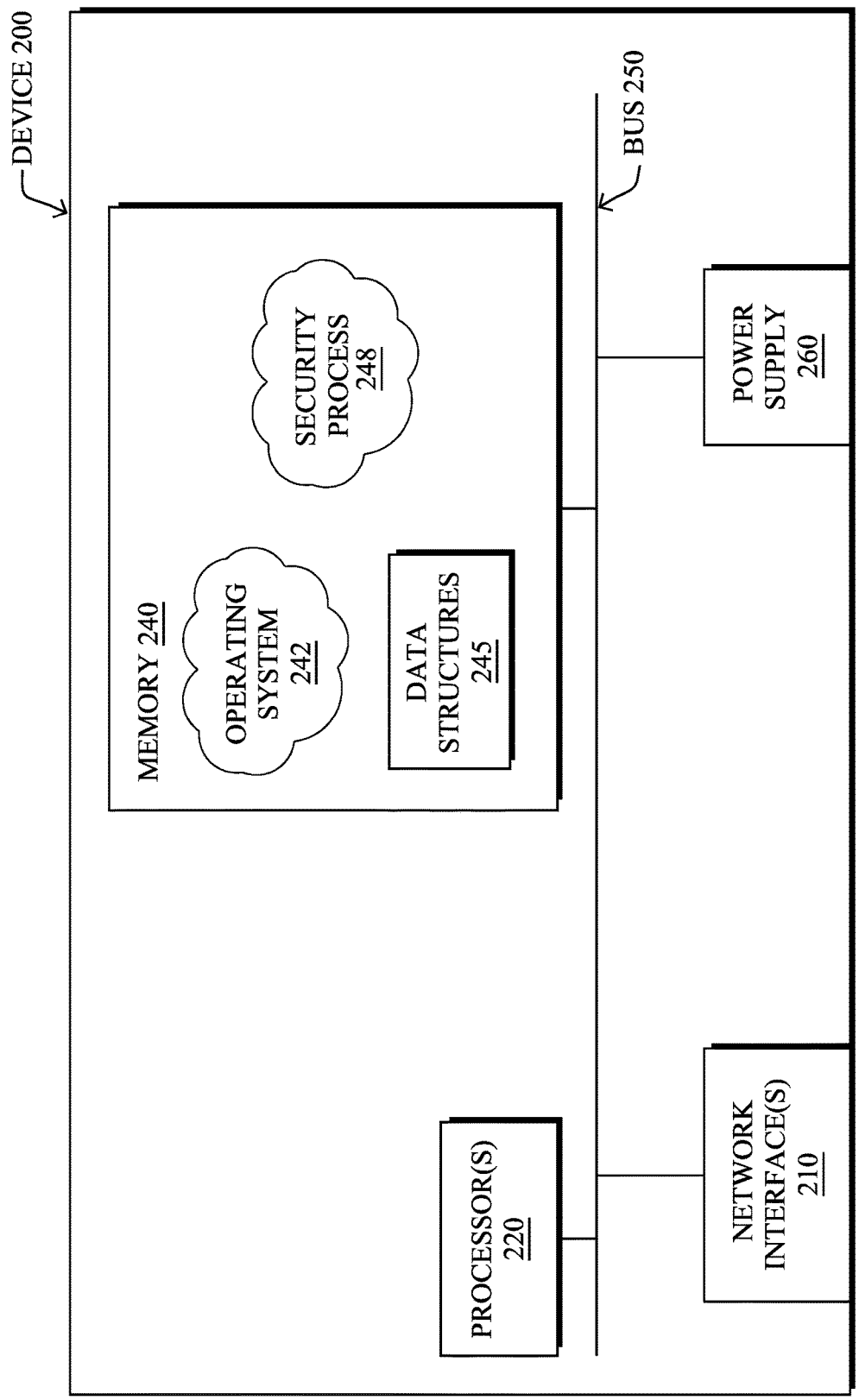
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a security process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, security process 248 may execute one or more machine learning-based classifiers to classify encrypted traffic in the network (and its originating application) for any number of purposes. In one embodiment, security process 248 may assess captured telemetry data regarding one or more traffic flows, to determine whether a given traffic flow or set of flows are caused by malware in the network, such as a particular family of malware applications. Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, security process 248 may classify the gathered telemetry data to detect other anomalous behaviors (e.g., malfunctioning devices, misconfigured devices, etc.), traffic pattern changes (e.g., a group of hosts begin sending significantly more or less traffic), or the like.

Security process 248 may employ any number of machine learning techniques, to classify the gathered telemetry data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, security process 248 can use the model M to classify new data points, such as information regarding new traffic flows in the network. Often, M is a statistical model, and the cost function is inversely proportional to the likelihood of M, given the input data.

In various embodiments, security process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that security process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, security process 248 may assess the captured telemetry data on a per-flow basis. In other embodiments, security process 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
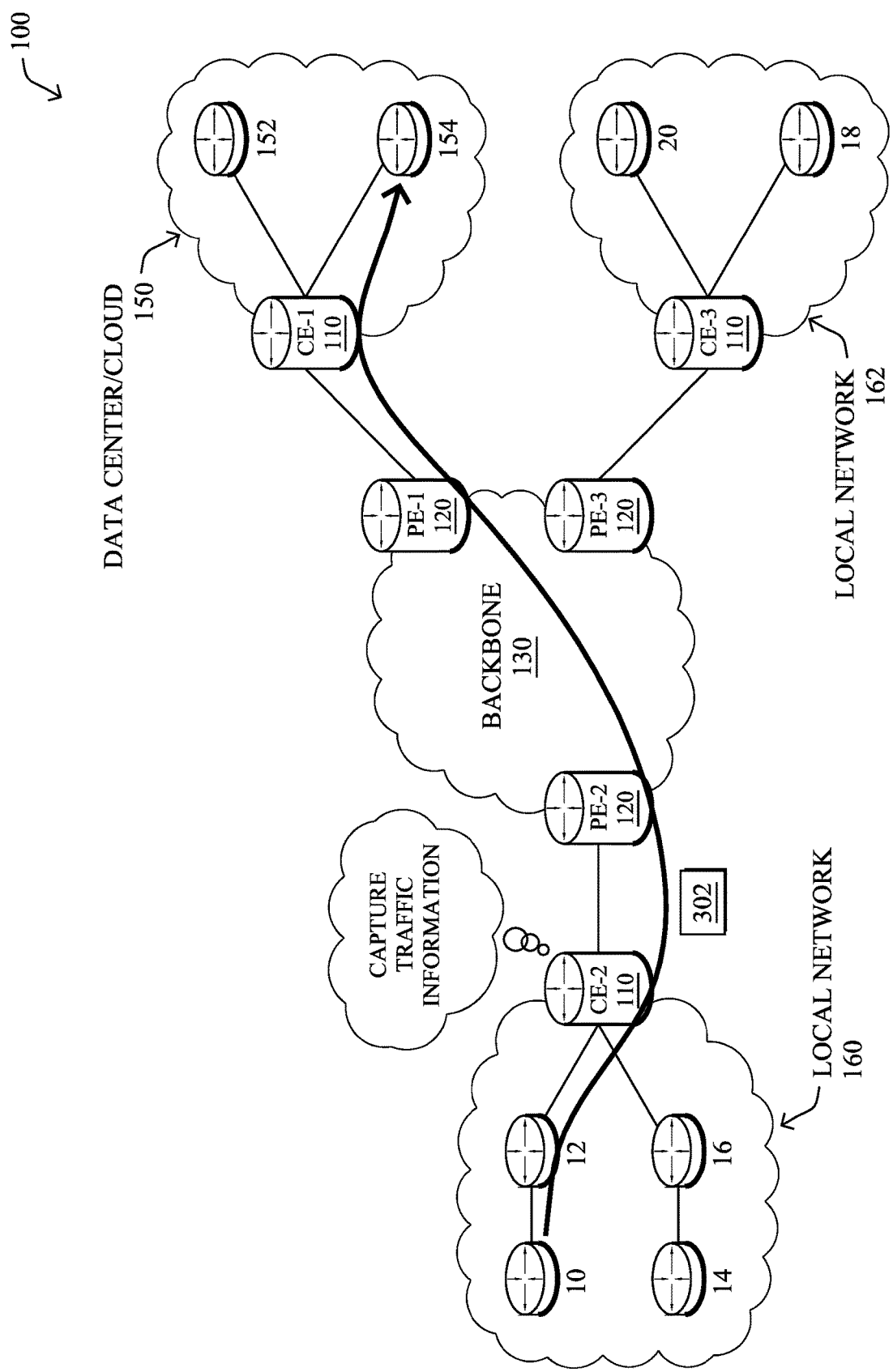
FIG. 3 illustrates an example of a device capturing traffic information.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, or other header information by analyzing the header of a packet 302. Example captured features may include, but are not limited to, Transport Layer Security (TLS) information (e.g., from a TLS handshake), such as the ciphersuite offered, user agent, TLS extensions (e.g., type of encryption used, the encryption key exchange mechanism, the encryption authentication type, etc.), HTTP information (e.g., URI, etc.), Domain Name System (DNS) information, or any other data features that can be extracted from the observed traffic flow(s).

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.). However, as would be appreciated, a traffic flow may also be encrypted, thus preventing the device from assessing the actual payload of the packet. In such cases, the characteristics of the application can instead be inferred from the captured header information.

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302. In further examples, the capturing device may capture sequence of packet lengths and time (SPLT) data regarding the traffic flow, sequence of application lengths and time (SALT) data regarding the traffic flow, or byte distribution (BD) data regarding the traffic flow.

As noted above, a security service may passively observe traffic with the goal of detecting malicious communications. One category of malicious communications involves traffic associated with remote administration Trojans (RATs) that are often delivered through (spear)phishing, and have been used for some of the most damaging security incidents. RAT detection from passive traffic monitoring alone is also particularly challenging. Indeed, it is often hard to discern between benign and RAT-related traffic with sufficient confidence to warrant taking actions, such as automatically killing a traffic session or alerting a network administrator. This is true even more so, when the traffic under scrutiny is encrypted, which is becoming increasingly common.

Triggering Targeted Scanning to Detect RATs and Other Malware

The techniques herein allow a security service to detect remote access Trojans (RATs) and other malware by identifying suspicious traffic sessions, estimating/classifying the RAT type associated with a session, sending one or more targeted scan messages to the suspected RAT server, and analyzing the resulting server response(s). In some aspects, the security service may craft the scan message(s) to elicit a server response that is characteristic of the RAT or other malware, and to not disrupt benign servers. In further aspects, the security service may obtain and analyze data from the RAT/malware observations, Internet scans, and/or benign traffic, to construct a library of targeted scan messages. To analyze the server responses, the security service may leverage various techniques such as pattern matching, machine learning, and/or estimation of the complexity of the server implementation.

Specifically, according to one or more embodiments of the disclosure as described in detail below, a security service classifies traffic telemetry data for traffic between an endpoint device and a server as potentially associated with a particular type of remote access Trojan (RAT). The security service constructs a scan message to elicit a type of server response associated with the particular type of RAT. The security service obtains a server response from the server, by sending the constructed scan message to the server. The security service determines whether the endpoint device is infected with the particular type of RAT, by validating whether the server response from the server matches the type of server response associated with the particular type of RAT.

Illustratively, the techniques described herein may be performed by hardware, software, and/or firmware, such as in accordance with the security process 248, which may include computer executable instructions executed by the processor 220 (or independent processor of interfaces 210) to perform functions relating to the techniques described herein.

Figure 4:
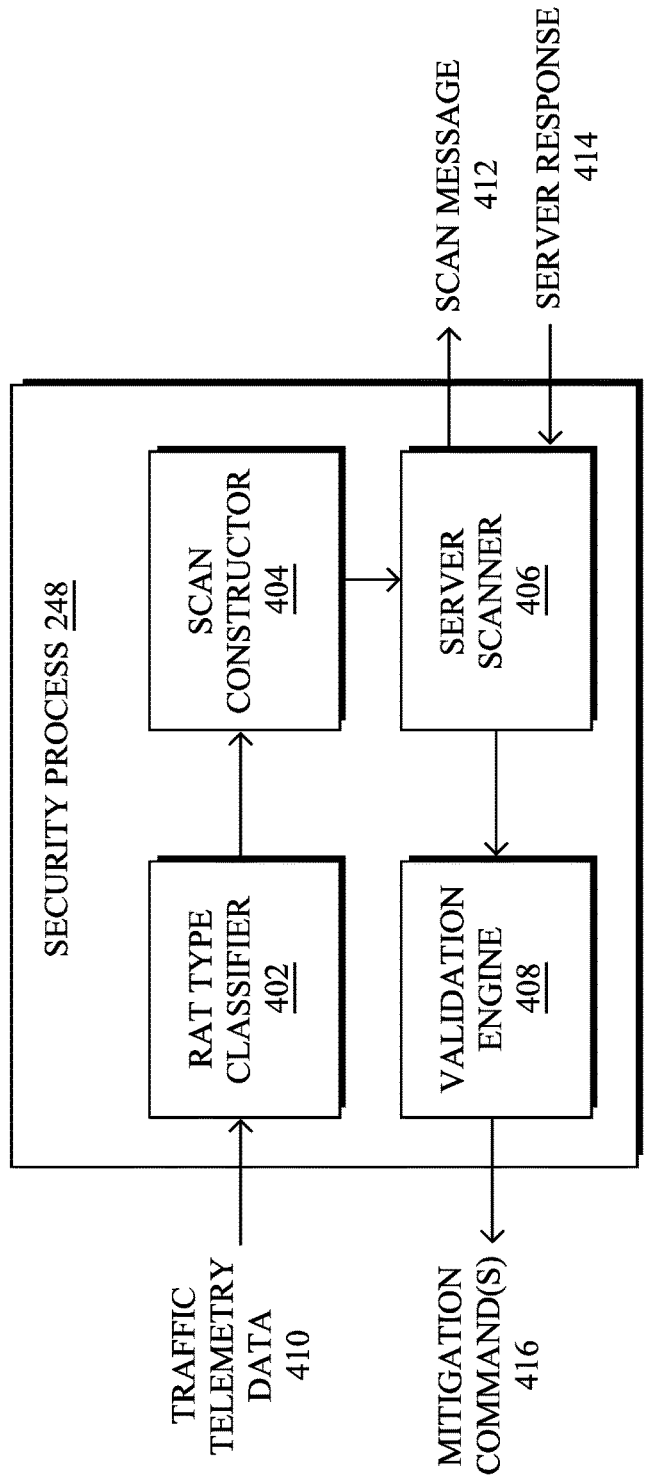
FIG. 4 illustrates an example architecture for triggering targeted scanning to detect remote access Trojans (RATs) and other malware.

Operationally, FIG. 4 illustrates an example architecture 400 for triggering targeted scanning to detect RATs and other malware, according to various embodiments. At the core of architecture 400 may be security process 248 that can be executed by a device in a network (e.g., device 200), e.g., to provide a security service to a network. As shown, security process 248 may include any or all of the following components: a RAT type classifier 402, a scan constructor 404, a server scanner 406, and/or a validation engine 408. Components 402-408 may be implemented in a distributed manner or implemented as part of their own stand-alone security service, either as part of the local network under observation or as a remote service. In addition, the functionalities of the components 402-408 of architecture 400 may be combined, omitted, or implemented as part of other processes, as desired.

In general, the security service provided by execution of security process 248 leverages passive network traffic monitoring, to detect malicious or suspicious (possibly malicious) sessions, including sessions from RATs such as, but not limited to, Metasploit's® meterpreter, Empire®, or Pupy®, and other malware. The security service also has the ability to send packets on the network being observed, and receive packets from them as well.

From a high level, in various embodiments, the security service provided by security process 248 may perform any or all of the following functions:

1. When an ongoing session is identified as suspicious, the service estimates what type of malware (e.g., meterpreter, generic RAT, etc.) it is, and constructs one or more scan messages specifically targeting the estimated malware type.
2. The service sends a targeted scan message to the suspected-malicious server, and the response message(s) are processed to extract data features that can be used to confirm or refute the 'malicious' designation. This processing may depend on the estimated malware type. Depending on the response, the security service may send one or more additional messages, to gather additional information.

As shown, security process 248 may include RAT type classifier 402 configured to classify traffic telemetry data 410 captured regarding network traffic between an endpoint device and a remote server. During execution, classifier 402 may use a set of detection methods that can filter out benign traffic and classify suspicious network flows into RAT categories. For example, RAT type classifier 402 may apply ground truth rules, as well as machine learning results, to the protocol headers and metadata of the traffic captured in traffic telemetry data 410. For instance, features such as inter-packet timing and packet size may help classifier 402 to determine the nature of the traffic flow. Passive monitoring can also help classifier 402 to single out specific RAT implementations, and provide scan constructor 404 with useful information to craft more precise scans.

Passive monitoring of network traffic to detect RATs is operationally attractive because there is no impact on the monitored endpoint devices and servers. However, such network-based detection of RATs is complicated by the fact that many benign remote administration tools display similar traffic patterns. Notably, even when classifier 402 has been trained to identify the traffic behaviors of specific types of RATs, each classification may not be guaranteed with 100% certainty and have an associated measure of confidence that security service 248 can use to drive further analysis via server scanning.

In various embodiments, RAT type classifier 402 may leverage any or all of the following passive detection techniques, as detailed below, to assess traffic telemetry data 410:

Tool-specific artifact analysis, such as XOR encoding scheme analysis
Custom plaintext protocol analysis
HTTP protocol analysis
TLS/Secure Socket Layer (SSL) protocol analysis
Polling behavior analysis In order to understand the various passive detection approaches introduced herein, one must first understand how most RAT-related attacks occur. Typically, most attacks can be divided into four stages: fingerprinting, exploitation, payload deployment, and post exploitation. Initially, the attacker fingerprints the victim network in search of vulnerabilities. During this phase, the goal is often to find an entry point to the network that can act as a pivot for attacking the target devices. In the exploitation phase, the attacker takes advantage of the discovered vulnerabilities, to execute a malicious payload. If the payload is too large, a payload stager may be executed, to download the malicious payload. Once in memory on the affected device, the payload performs the desired malicious action. In most cases, the payload will open a network channel with the command and control (C&C) server, to allow for post exploitation. At this point, the C&C server will communicate with the target system, to execute other actions.

Of course, specific attacks might not include all of the above phases. For example, some attacks can use spearphishing techniques to directly trigger the payload deployment phase by exploiting human behavior instead of software vulnerabilities. For purposes of illustrating the techniques herein, assume that the RAT attacks include a post-exploitation phase in which the endpoint device and server communicate. Certain aspects of the techniques herein focus on identifying and analyzing this post-exploitation phase, in order to uniquely characterize RAT behavior.

In order to highlight the efficacy of the various passive analysis techniques herein, prototype systems were developed on three popular, open-source attack frameworks: Metasploit®, Empire®, and Pupy®. For each of these, ground truth data was collected from traffic in an enterprise network that was known to be benign, as well as ground truth data collected from RAT traffic in a lab environment consisting of a Kali Linux® virtual machine configured to pose as the C&C server. Five vulnerable virtual machines were also created with unpatched Windows® 10, Windows® 7, Windows® XP SP2, Ubuntu® 14.04, and Ubuntu® 15.10 operating systems. The diversity in the vulnerable VMs tested how a given attack tool behaved when exploiting different environments.

Regarding the tested attack frameworks, the Metasploit framework is a comprehensive network penetration testing tool. Its functionalities cover every part of an attack, from the initial reconnaissance to the post-exploitation phase. A user of the framework can fingerprint targeted systems, record their vulnerabilities in a local database, select a relevant exploit, choose an appropriate payload, and open a communication channel. Furthermore, this tool allows the user to obfuscate its network traffic by customizing the exploits, encoding the payloads, and communicating over encrypted TLS connections.

Metasploit's Meterpreter is a versatile RAT that can run on most platforms, and provides flexibility through an extensive set of dynamic modules. Despite the obfuscation tools offered by Meterpreter, all modules use the same underlying network implementation.

Empire is an encrypted RAT written in Python® and Powershell®, and is mostly focused on the two last phases of an attack. It allows the user to choose a transport protocol, a specific payload, and can open multiple listeners to wait for incoming connections. An attacker can use the Empire server as a gateway to a second C&C server, Empire or otherwise, allowing infected devices to transparently connect to any server in the case where gateway routers are compromised.

Empire primarily uses HTTPS to communicate, and provides C&C over services such as Dropbox® or OneDrive®. Similar to benign connections to these services, Empire uses standard protocols to transmit encrypted data. All Empire messages are encrypted with AES, and prepend a header to save metadata about the session. The header is RC4 encrypted using a key composed of the SHA digest of a user specified, which disallows interoperability between two Empire servers unless they share the same master password.

Pupy is a Python-based, cross-platform RAT that focuses on the obfuscation of its C&C communications, and only provides the post-exploitation phase of an attack. Pupy enables the user to select a transport protocol from a list of 11 possibilities, most encrypted with a set of precomputed keys shared within the payload. The user can stack these protocols to further increase obfuscation. Pupy supports Tor's obfs3 with an extra layer of RSA+AES, RSA+AES over HTTP or TLS with client certificates.

As noted, RAT type classifier 402 may comprise any number of distinct detection models that operate on the passively collected traffic telemetry data 410 regarding traffic between an endpoint device/client in a network and a server. The goal of these models is not only to detect general RAT behavior, but also to identify specific RAT implementations. Some of these may operate on individual, bidirectional flows, while others may operate on collections of bidirectional flows, or meta-flows. As referred to herein, a meta-flow is a set of flows that share the same source IP, destination IP, and destination port. In some embodiments, the models may take the form of machine learning-based classifiers, such as a random forest model with any number of individual decision trees.

Figure 5:
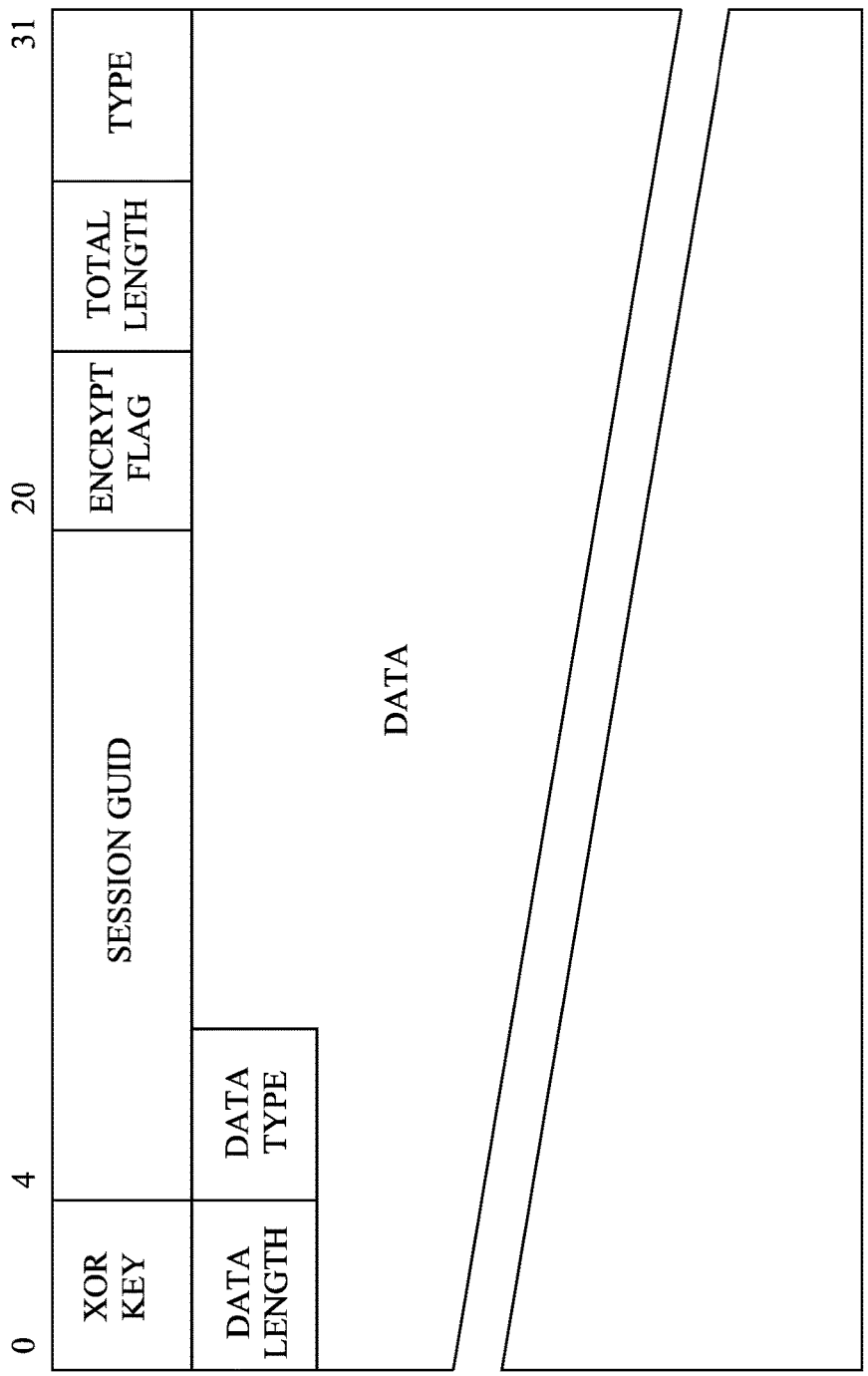
FIG. 5 illustrates an example Meterpreter packet.

When not TLS encrypted, the Meterpreter payload communicates by using a custom protocol that uses type-length-value (TLV) formatting for each data field. This data is obfuscated by XOR-encoding the payload data with a random four byte mask, and then prepending the mask to the payload. FIG. 5 illustrates the full Meterpreter packet format 500. In some embodiments, RAT type classifier 402 may use the first four bytes in the payload of a packet to decode the first 32 bytes of the packet, in an attempt to recognize a "size" field, a "type" field, and a session identifier.

In the case of Meterpreter using HTTP messages, RAT type classifier 402 may simply check that the length in the header corresponds to the length of the packet. TCP is more complicated because some Meterpreter messages might be larger than the maximum transmission unit (MTU), and will span across multiple TCP packets. In this case, classifier 402 may buffer all possible Meterpreter packets until one message is complete, i.e., one of the lengths of a buffered message is equal to the total length of the buffered packets.

In addition to RAT-specific encodings, many RAT-related payloads simply send plaintext commands over the communication channel. Accordingly, in some embodiments, RAT type classifier 402 may leverage pattern matching to identify common commands in the plaintext payload of packets captured in traffic telemetry data 410 (e.g., in the first 32-bytes of the packet data). For example, such commands may include ls, cd, dir, remoteControl, or the like.

In further embodiments, RAT type classifier 402 may also perform HTTP analysis, to classify traffic telemetry data 410. In general, the use of HTTP by a RAT attack tools differs from typical browser-based behavior. Notably, the endpoint typically uses HTTP GET requests for network polling and POST requests when transmitting data. In turn, the server typically responds with an HTTP 200 status code when it has a query to transmit, and an HTTP 404 status code, if not. When transmitting data, the content-type is often text/html, despite the content being base64 encoded data, without any specified content-encoding. Thus, classifier 402 may analyze the first bytes of the payload captured in traffic telemetry data 410, to identify discrepancies between the advertised content-type/content-encoding and the actual data. The endpoint device always sends similar GET requests, because it cannot predict the needs of the C&C server, but the server responds with variable payloads, which depend on the action of the user. This creates situations in which two requests to the same uniform resource identifier (URI) result in different server responses.

In most cases, the base URI (e.g., the URI stripped of its variable parameters) of the requests by a RAT infected device does not change for a given session, and based on source code analysis, is either fixed or selected from a set of URIs. Benign HTTP traffic often visits different webpages, making this behavior particularly noticeable by classifier 402. Attack tools generate large strings for the variable input of the full URI. In some cases, these strings have random components to avoid pattern-matching detection, and are long in order to transmit information or invoke unintended server responses.

To increase scalability and efficiency, exploits employ a minimal set of features, e.g., HTTP requests will have a limited number of headers. The rationale behind this choice is that many HTTP headers are used to provide the malicious user with extra features such as session control or advanced security. However, these might also cause undefined behavior on some endpoints. To capture this, RAT type classifier 402 may calculate an HTTP implementation score for traffic telemetry data 410, defined as the number of header fields plus the number of cookies in the HTTP traffic of the endpoint device.

The RATs tested also exhibited their own unique set of HTTP characteristics. In the case of Metasploit, GET packets always contain certain headers and values, e.g., Accept-Encoding: identity and Content-Type: application/octet-stream. Empire's HTTP module uses session cookies to convey encrypted information about the client, resulting in highly dynamic cookie values relative to benign traffic. Empire's HTTP-COM module also uses the CR-RAY header to transmit client information, and RAT type classifier 402 may identify HTTP requests as being Empire-related, if the CR-RAY value indicated in traffic telemetry data 410 does not correspond to a valid Cloudflare server hash. Pupy uses User-Agent: Mozilla/5.0 (Windows NT 6.1) AppleWebKit/537.36 (KHTML, Gecko) Chrome/41.0.2228.0 Safari/537.36 for all GET requests, which classifier 402 can identify as anomalous relative to User-Agent strings corresponding to the monitored endpoint device. Pupy also generates a random hostname that is used in the Host header, which classifier 402 can also assess.

In various embodiments and based on the above observations from testing, RAT type classifier 402 may comprise a machine learning-based classifier that is trained to classify traffic as potentially being associated with a particular RAT type based on any or all of the following traffic features from traffic telemetry data 410:

The variable response ratio
User-Agent
Host entropy
Host consonant-to-vowel ratio
Ratio of variable session cookies
The three largest URI proportions
GET, POST and OK average scores, lengths, and proportions
Server
URI entropy
URI consonant to vowel ratio
Max URI length
Meterpreter HTTP filter
Empire HTTP filter
Packet count
Encrypted content with text/html type As noted above, RAT type classifier 402 may also perform TLS/SSL analysis on traffic telemetry data 410, to determine whether the associated traffic is indicative of a particular type of RAT. Preliminary testing has revealed that many RATs use server certificates that are self-signed and contain identifying information in the subject and issuer fields. For example, the default certificate for Meterpreter is self-signed and contains predictable organizational unit names which are randomly selected from a pre-populated list. Pupy uses client certificates where the organizational unit names contain the words CLIENT and CONTROL. Due to the C&C servers having shorter lifespans due to remediation, the associated certificates generally have more recent validity start times. Finally, many RATs were found to often use many different TLS connections, each one sending a small number of requests to the same server.

Similar to the HTTP analysis by RAT type classifier 402, classifier 402 may also include a machine learning-based classifier that classifies traffic as being associated with a particular RAT type, based on any or all of the following features that may be captured in traffic telemetry data 410:
 TLS Version
 Self-signed certificate
 Flow average length
 Number of TCP packets
 Number of certificate extensions
 Certificate chain length
 Certificate subject score
 Meterpreter certificate filter
 Pupy certificate filter
 Elapsed certificate validity
 Validity length In further embodiments, RAT type classifier 402 may also perform polling analysis on traffic telemetry data 410, to detect certain types of RAT behavior in the traffic of an endpoint device. As would be appreciated, asynchronous RAT communications use polling to query the C&C server for new commands. Polling is a popular method of communication because it does not require a stable network connection and is robust against network address translation and firewall devices. Fortunately, the network behavior associated with this form of communication is predictable, and the inter-packet and inter-flow time distributions vary between RAT implementations.

Preliminary testing has revealed that RAT-related polling has three unique activities in the attack lifecycle. The first activity involves the infected machine retrieving information from the C&C server by sending regular probes. The second activity is initiated when the TCP connection is broken. If the endpoint client is unable to connect to the C&C server, it will attempt to initiate new TCP handshakes at regular intervals. The third activity occurs when the TCP connection is intact, but the attacker is not sending commands. To check server connectivity, the endpoint client sends TCP keep-alive ACK packets, in an attempt to trigger a response from the server. This is standard TCP behavior, but is implemented in a different manner for the attack tools we analyzed because they need to be more robust with respect to broken connections. Table 1 below summarizes the observed behaviors of different types of RATs:

TABLE 1

| Attack Tool | Information Retrieval | Broken TCP | Keep-Alive |
| --- | --- | --- | --- |
| HTTP(S) Meterpreter | Exponential backoff (Alg. 1) | Constant delay (default 10 seconds) | N/A |

TABLE 1-continued

| Attack Tool | Information Retrieval | Broken TCP | Keep-Alive |
| --- | --- | --- | --- |
| TCP Meterpreter | N/A | Constant delay (default 10 seconds) | Standard |
| Empire | Constant delay w/ jitter (Alg. 2) | Constant delay w/ jitter (Alg. 2) | N/A |
| Pupy | N/A | Randomized delay | ACK every 5 m × 10 |

For HTTP(S) polling, Meterpreter was found to use the following algorithm to calculate the delay between polls:

Algorithm 1 - Delay between two Meterpreter HTTP polls

```
empty-count = 0
while True do
    Send packet
    if Empty answer then
        delay = 100 x empty-count
        empty-count++
        sleep(min(10000 / delay) / 1000)
    else
        process( )
        empty-count = 0
    end if
end while
```

Similarly, Empire was found to use the following algorithm to calculate the delay between polls:

Algorithm 2 Delay between two Empire polls, delay > 1 s, jitter ∈ [0, 1]

```
while True do
    min ← delay x (1 - jitter)
    max ← delay x (1 + jitter)
    sleep(rand(min, max)) packet.send( )
end while
```

Figure 6:
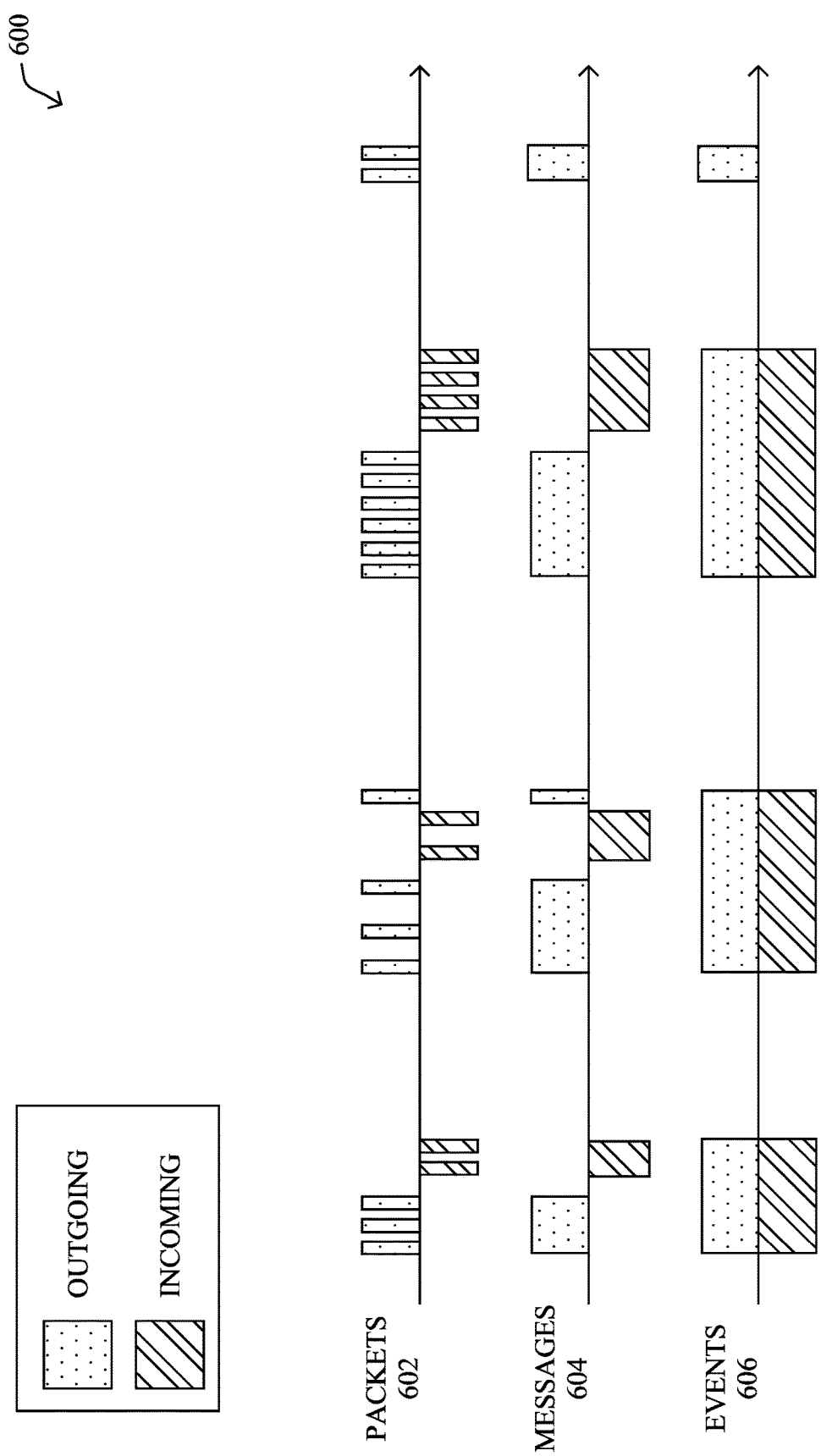
FIG. 6 illustrates an example of event parsing.

Based on the above observations, RAT type classifier 402 may also include one or more polling detectors configured to detect the specific polling behavior associated with a particular type of RAT in traffic telemetry data 410, in various embodiments. More specifically, such a polling detector may rely on a bidirectional, TCP-aware, time parser that gives consistent regularized packet times across different network environments. The round-trip time (RTT) can be calibrated as desired. First, classifier 402 may regularize the timing of the packets with the TCP-aware parser and merge packets into messages that are collections of packets that reflect an application socket write. To improve efficacy, classifier 402 may then aggregate messages into events, which are groups of messages that reflect a transaction, i.e., a GET request and the subsequent response, or a TLS handshake. FIG. 6 illustrates an example 600 of this process whereby observed packets 602 (e.g., both outgoing and incoming packets for the endpoint device) are aggregated into messages 604. In turn, messages 604 can be aggregated into events 606.

In one embodiment, RAT type classifier 402 may include a first polling detector that is configured to detect exponential-backoff polling, and fits the following equation onto the data:

$$X_{i+1}=X_i+(k+1)N+G_i \quad (1)$$

where N, k and $X_i$ represent the base delay, number of unanswered packets, and the event start times, respectively, and are all positive integer parameters. $G_i$ is a sequence of normally distributed independent random variables with:

$$\forall i>0, G_i \sim N(0, \sigma^2) \quad (2)$$

The Gaussian distribution accounts for variable RTTs. The detector first looks at a fixed segment within a window of length 6, or any other suitable window length, and computes the empirical values of N, k, and σ. The detector then checks whether these parameters are consistent, by verifying that both N and k are positive, and have a reasonable standard deviation. If these checks fail, the detector shifts the window to the right by one. The detector then loops over the next set of time values, and appends the values to the sequence if the newly computed parameters are still consistent and they fall within [$X_t$+(k+1)N±min(3σ, 15)]. The parameter 15 prevents small changes of less than 15 ms impact the detection. The detector can also use any other suitable time limit, as desired. Finally, the detector merges polling ranges when possible, e.g., the range has the same N value and consistent k values, etc.

In further embodiments, RAT type classifier 402 may include another polling detector that looks for constant-delay polling with a possible uniformly-distributed jitter ∈[0, 1] as follows:

$$X_{k+1} = X_k + d + U_k \quad (3)$$

where N, d, and $X_k$ represent the base delay, average wait time, and the sequence of event start times, respectively, and are all positive integer parameters. $U_k$ is a sequence of uniformly distributed independent random variables, with:

$$\forall k>0, U_k \sim U(d(1\pm \text{jitter})) \quad (4)$$

RAT type classifier 402 may take the data points and transform them to a Gaussian sample using the Box-Muller transform, and then test the quality of the fit with the Shapiro-Wilk test.

Another polling detector of RAT type classifier 402 may examine the lengths of events (e.g., events 606 in FIG. 6), based on the assumption that polling events have similar lengths, in further embodiments. Such a detector may do so by computing a histogram of the event-based lengths. If the histogram is skewed towards a small set of lengths, the detector may flag the sequence of events as potential polling behavior.

According to various embodiments, if RAT type classifier 402 suspects RAT behavior from traffic telemetry data 410, scan constructor 404 may construct a targeted scan message to confirm or refute the findings of RAT type classifier 402. Scan constructor 404 may, for example, construct scan messages targeted towards the destination address and port of the server associated with traffic telemetry data 410, using a source port that is distinct from that observed in the suspicious session. The source address may be distinct as well, or the source of the suspicious session may be spoofed, in various cases.

In various embodiments, scan constructor 404 may construct a scan message by making use of any or all of the following:
1. Session data, such as information about the server such as its Internet address, its linked DNS name, the HTTPS SNI field, and the server certificates provided in HTTPS, as well as data obtained from studies of decrypted malicious (ThreatGRID, Metasploit) data,
2. Analysis of benign data obtained in HTTPS scans of Internet destinations,
3. Analysis of malware behavior in sandboxes (such as ThreatGRID) and honeypots.

In one embodiment, scan constructor 404 may use a library of targeted scan messages for each malware/RAT type that implemented in advance.

Scan constructor 404 can also analyze the passively obtained data features from the encrypted suspicious session, as captured in traffic telemetry data 410, to guide the construction of targeted scan messages. For HTTP-based malware, for example, scan constructor 404 may use this analysis to estimate the HTTP methods (GET, POST) and URIs that should be used in the scan message. Scan constructor 404 can also analyze the passively obtained session data features, to estimate the HTTP user agent and the length of the URI. Further, scan constructor 404 can use the estimated user agent in the targeted scan, and the URI-length estimate can guide the selection of the URI used in that message.

Once scan constructor 404 has constructed a scan message, server scanner 406 may obtain a server response 414 from the server by sending the constructed scan message 412 to the server. In turn, validation engine 408 may compare the server response 414 to the suspected behavior from classifier 402, to determine whether the endpoint device is indeed infected with a particular type of RAT or other malware. If so, validation engine 408 may initiate any number of migration actions by sending one or more mitigation commands 416. For example, a mitigation command 416 may cause a display device or other user interface to present an alert to a network administrator regarding the findings. In further cases, a mitigation command 416 may initiate automatic mitigation actions in the network, such as by blocking or redirecting traffic associated with the infected endpoint device and/or the server.

As noted, scan constructor 404 may, in some embodiments, construct scan messages that are specifically targeted to the type of RAT or other malware identified by RAT type classifier 402. For example, if RAT type classifier 402 suspects the presence of Metasploit infection, scan constructor 404 may generate a targeted scan message using a crafted URI in an HTTP, HTTPS or TCP request that will trigger the server to reply with an exclusive-or encoded Meterpreter packet in server response 414, which validation engine 408 can identify using pattern-matching techniques.

For Empire, another common RAT, scan constructor 404 may construct two separate targeted scans to identify the server. The first is a generic HTTP message directed towards the URI /admin/get.php, which will trigger the default response of the server, while the other uses captured HTTP headers, making the server respond with encrypted data in server response 414.

Finally, for the Pupy RAT, scan constructor 404 may construct three targeted scan messages, that will each provoke specific responses 414 and help validation engine 408 to confidently identify such a server. The first such scan message is a simple HTTP GET message with no headers, that does not trigger any response on the Pupy HTTP server, the second scan message is the same with any random header, that will trigger the server's default response, while the last scan message is a copy of a captured packet, which sets off an encrypted response inside of an HTTP message in server response 414.

Validation engine 408 can learn from a server response 414, even if the server does not understand scan message 412, by analyzing the response details, such as the TCP flags used to close the connection, the HTTP response code, if any, or the response text. One possible probe strategy is to send a malformed HTTP request. In this case, even if the server returns a 404 status-code, validation engine 408 can analyze its headers, and estimate the server's implementation complexity. For example, validation engine 408 can measure the server complexity based on the number of headers used in the response and the number of cookies. This is because many legitimate web servers will use many headers and cookies to provide a better experience for the end user, while RAT developers are focused on efficiency and reliability, using minimal implementations to ensure functionality across different endpoints.

Note also that if security process 248 relies on a SPAN or TAP interface for its passive observations of network traffic (e.g., traffic telemetry data 410), then scan message 412 will need to be sent on a different interface.

In various embodiments, security process 248 may perform the targeted scanning either in parallel with the session between the endpoint device and the server (e.g., by starting a new session with the server) or in a disruptive manner. Notably, scan constructor 404 may, in some cases, disrupt the suspicious session by intercepting packets of the suspicious session and altering packets of the session. For instance, scan constructor 404 can interfere with an Empire HTTP connection in a way that will produce predictable results. More specifically, changing the X-ORing byte 14 of the Empire header with a value of 5 will trigger the server to response with encrypted data, while X-ORing byte 12 with any value will set off a 401 UNAUTHORIZED response. Although more intrusive, this method is more precise at identifying an Empire server and does not require passively obtained data to function.

Scanning a suspicious server with packets constructed to evoke specific responses provide a high fidelity source of data. This allows security process 248 to test for well-known queries and gain visibility into encrypted payloads. As noted, the first targeted scanning approach that process 248 may employ, referred to as parallel scanning, opens a new connection to the suspect device, and works on both reverse and bind mechanisms. The second approach, disruptive scanning, manipulates packets in an active session, in order to study how the session responds. However, sending scans is resource and time consuming, and should not be applied to all traffic because it is disruptive and invasive. In some embodiments, scan constructor 404 may also select between the two approaches, based on a measure of confidence calculated by classifier 402 for its classification of traffic telemetry data 410.

Said differently, security process 248 can associate the passively observed traffic with a probable attack tool implementation/RAT type and communication protocol. In turn, security process 248 can craft specific packets using previous knowledge to trigger known server responses, in order to confirm the identity of the attack tool/RAT type. For example, by sending two probes, one with a session cookie value captured from previous data, and another with a random value, security process 248 can determine if the server hosts an Empire HTTP listener.

In the case where RAT type classifier 402 suspects malicious activity, but the passive monitoring fails to identify a specific C&C implementation, security process 248 may send packets to the server with the observed protocol and study the server response. In some embodiments, validation engine 408 may use a machine learning classifier based on features derived from deep packet inspection, which provides detailed information about the plaintext messages. The features can include response time and size, straightforward Meterpreter and Empire filters, a plaintext filters, and/or features derived from byte analysis.

The byte analysis by validation engine 408 may look at the entropy and byte distribution of a fixed-window, to analyze string patterns in the body of server response 414 and differentiate code, text, and random values. Many exploits abuse application vulnerabilities by overflowing memory buffers in order to corrupt the program memory and execute malicious code. These packets typically contain padding or NOP sleds in order for the vulnerable program to execute the desired code. C&C packets contain a mixture of compiled code, interpreted code, and data stores, which each have specific entropy values and byte distributions.

Figure 7:
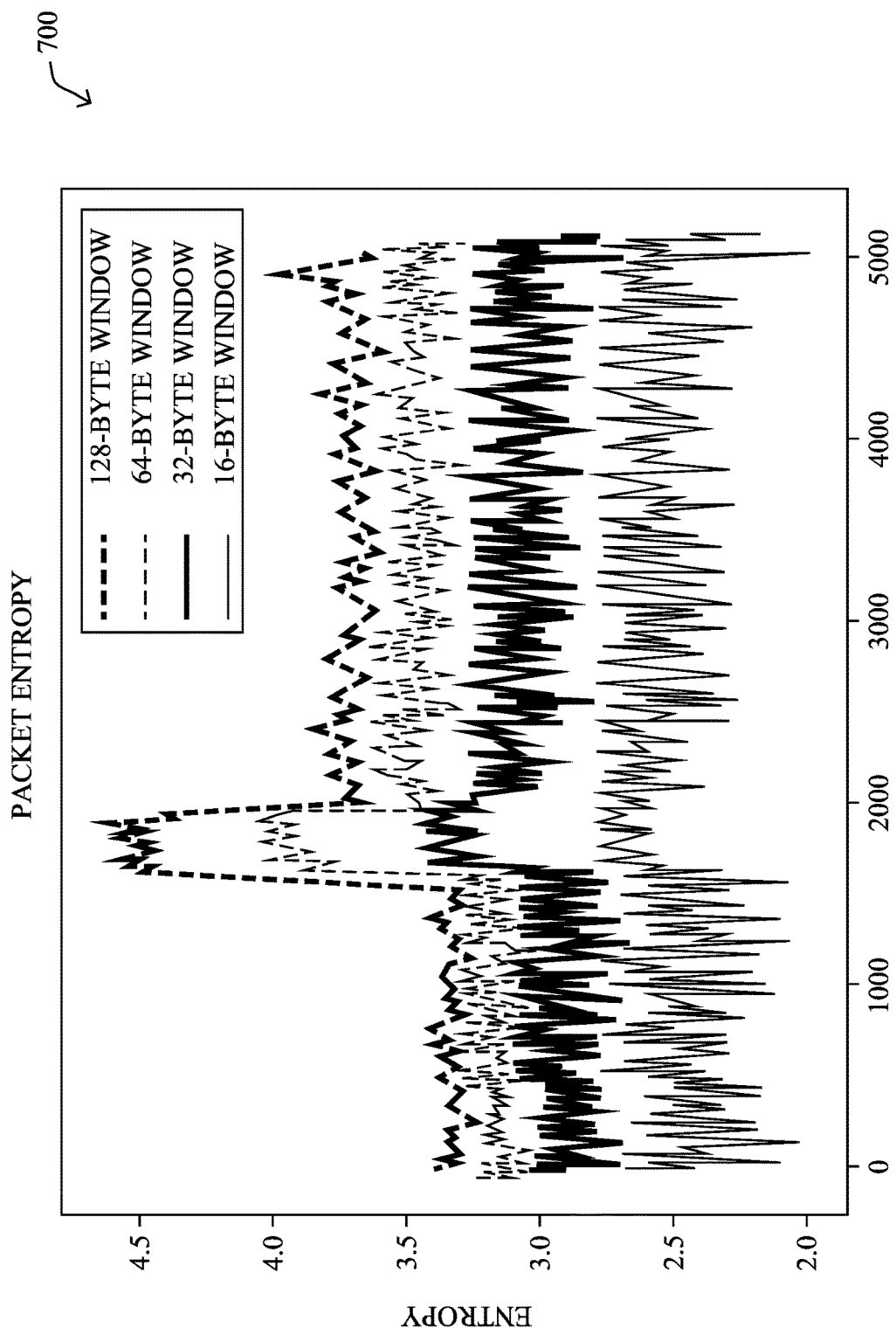
FIG. 7 illustrates an example entropy plot.

For example, validation engine 408 may calculate the entropy at a specific index of the packet data over a substring of length n starting at that index. The features can be computed with Shannon's information entropy as follows:

$$H_i(X) = \sum_{c \in X[i:i+n]} -p_c \log(p_c) \qquad (5)$$

where $p_c$ is the frequency of character c in the X [i:i+n] substring. In turn, validation engine 410 can use the prevalence of the three most common bytes and a fixed number of entropy bins as features for its machine leaning classifier. FIG. 7 illustrates a plot 700 of the entropy features for the EDB40869 exploit for different window sizes and with a start index for each of the first 5,000 bytes.

The most effective but intrusive way to identify a C&C server is through interfering with active connections. This can be illustrated with respect the Empire C&C implementation. If such an infection is suspected, scan constructor 404 can use RC4's vulnerability to bit-flipping, to modify the session identifier, language, meta, extra flags, and length contained within Empire's RC4 header. The Empire network frame is implemented as an HTTP header, e.g., in the value of the Cookie or CF-RAY headers, or directly in the body of an HTTP message.

Figure 8A:
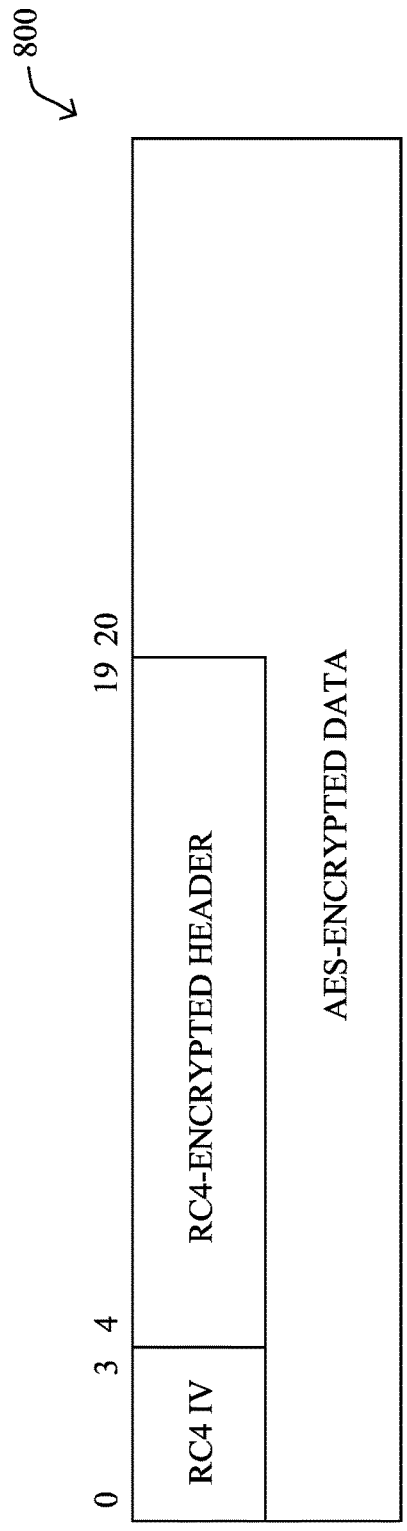
FIGS. 8A-8B illustrate examples of Empire RAT message information.
Figure 8B:
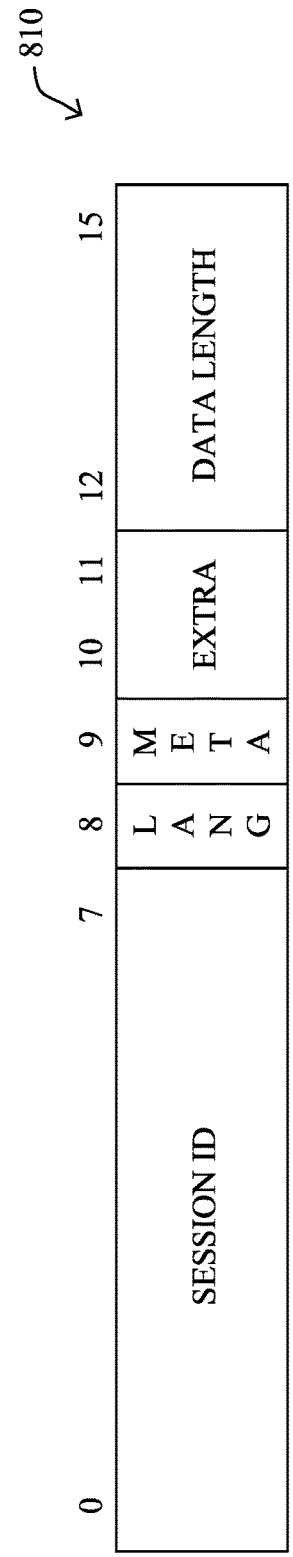

The format for the Empire network frame is shown in FIGS. 8A-8B, illustrating the Empire routing packet format 800 and the Empire RC4-encrypted header format 810, respectively. The Session ID is a unique identifier for the C&C session. Lang is the programming language of the payload, where the attacker can specify Powershell, Python, or None. Meta describes the purpose of the packet, where the attacker can specify Stage 0 (S0), Stage 1 (S1), Stage 2 (S2), Tasking Request (TR), Result Post (RP), Server Response (SR), or None (NA). Extra is a field that can have any value and is currently not used. Data length is the length of the AES encrypted data.

When first installed, the payload stager will send the C&C server an HTTP GET request with the meta flag set to S0 to retrieve the next stages of the full Empire client. The remaining Empire payload is dependent on the target platform. The next two stages send HTTP POST requests that contain information about the operating system with the meta flags set to S1 and S2. All responses have status-code set to 200 and are encrypted.

Once successfully installed, the client begins its normal operating cycle, which sends an HTTP GET request at regular intervals with the meta flag set to TR. If the server has a command to issue, it will respond with a status-code: 200 message with the SR meta flag set and containing the command. The client will then send an HTTP POST with the SR meta flag set and containing the encrypted response. If there is no command to issue, the server will send back a status-code: 404 message with a "file not found" HTML page.

Referring again to FIG. 4, with bit-flipping, scan constructor 404 can change the values inside of the RC4-encrypted header without knowledge of the plaintext. Post installation, the client will be in the TR state in most cases, and security process 248 can take advantage of this fact to makes assumptions on the content of the header. Changing the value of the lang or extra bytes will not change the behavior of a tasking request, but XORing the meta byte with the meta-value for RP will change the flag from TR to S0. The S0 meta-value will force the server to send the first stage again. XORing the meta byte with any other value will cause a parsing error in the server.

Thus, security process 248 can leverage the above observations to build an active interference system that would change specific bytes in the outgoing client traffic of a suspect flow, and analyze the response. By applying the previous transformations to the Cookie or CF-RAY header, security process 248 can detect an Empire C&C channel with high efficacy. However, it should also be noted that this technique is intrusive and is highly disruptive in the case of benign HTTP sessions. Accordingly, scan constructor 404 should only use this approach when classifier 402 determines that the target connection is highly suspicious.

Figure 9:
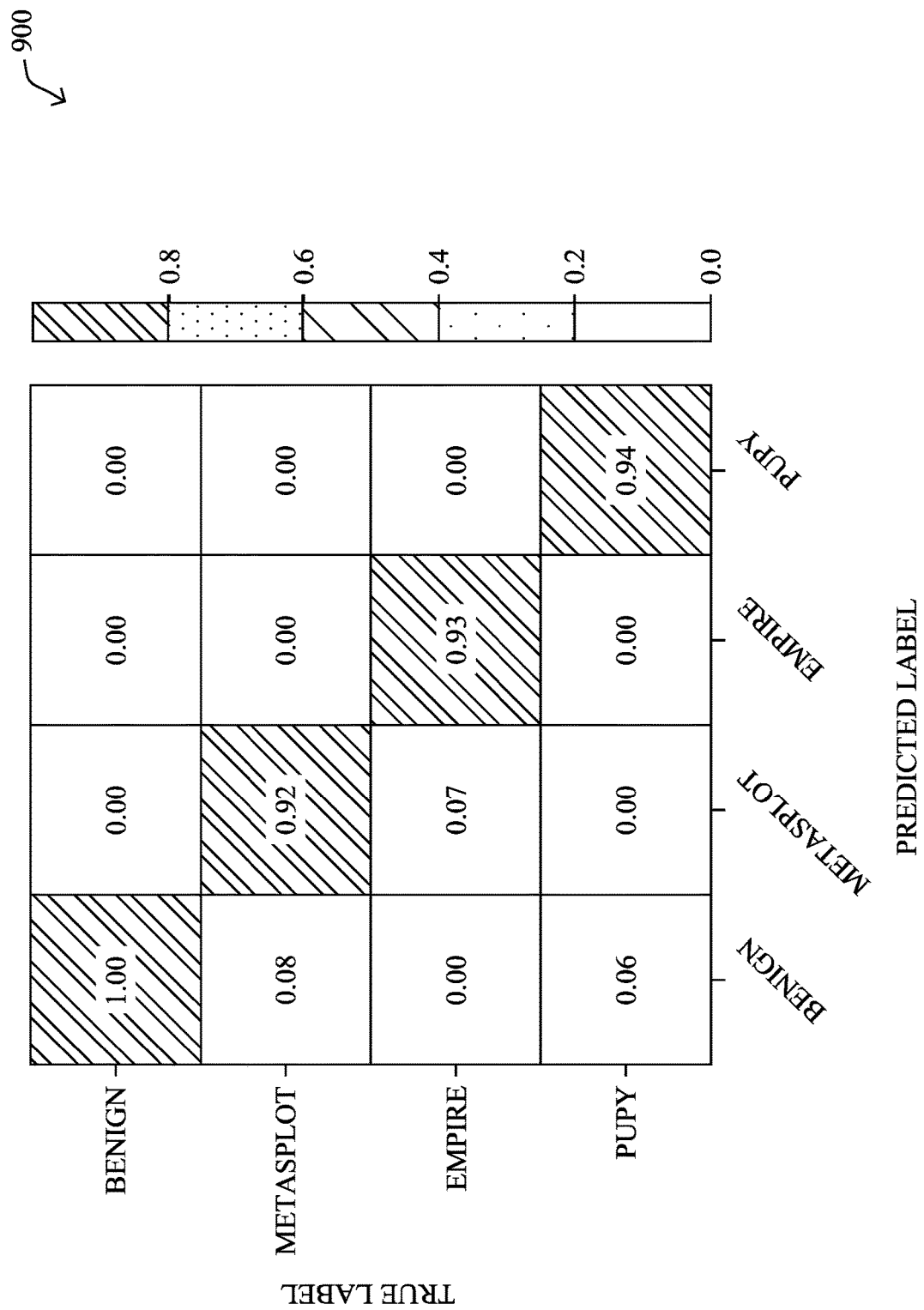
FIG. 9 illustrates an example confusion matrix.

To test the efficacy of the techniques herein, a prototype of security process 248 was built. While the individual passive detection techniques above work well against their targeted classes, RAT type classifier 402 was implemented as a general classifier that could simultaneously perform well on all studied classes and potentially generalize to new classes of attack tools, using hierarchical classification to generate the final class label for a given connection. In the first layer, the individual detection approaches above were used to compute categorical or continuous labels, depending on the nature of the underlying method. In turn, a classifier was trained on top of these outputs, to produce the final classification. FIG. 9 illustrates the resulting confusion matrix 900 for the 10-fold cross-validated results. Despite significant class imbalance, the prototype system was able to identify each attack tool with at least a 92% true positive rate. Out of the 50,000 benign samples, the system had 6 false positives, or a false positive rate of approximately 0.01%. Assuming that malicious samples classified as any attack tool are considered true positives, this gives a true positive rate of approximately 98.5%.

Figure 10:
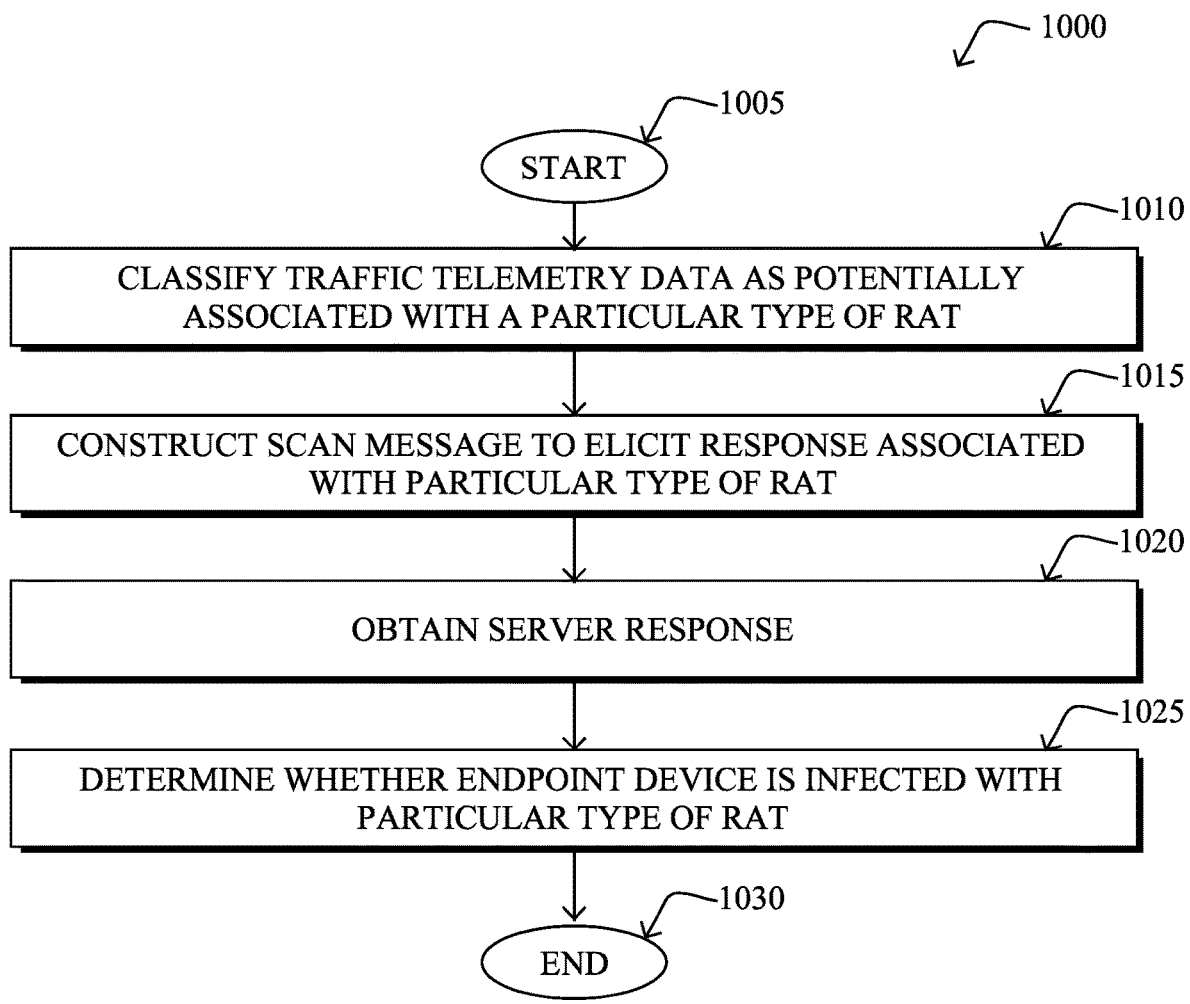
FIG. 10 illustrates an example simplified procedure for triggering target scanning to detect RATs and other malware.

FIG. 10 illustrates an example simplified procedure for triggering target scanning to detect RATs and other malware, in accordance with one or more embodiments described herein. For example, a non-generic, specifically configured device (e.g., device 200) may perform procedure 1000 by executing stored instructions (e.g., process 248), to provide a security service to one or more monitored networks. The procedure 1000 may start at step 1005, and continues to step 1010, where, as described in greater detail above, the security service may classify traffic telemetry data for traffic between an endpoint device and a server as potentially associated with a particular type of remote access Trojan (RAT). For example, the service may apply a machine learning-based classifier to the traffic telemetry data, whereby the classifier applies a label for the particular type of RAT to the traffic telemetry data from among a plurality of RAT types. Such a classification may also leverage any or all of the following forms of analysis: HTTP(S), TLS/SSL, polling (e.g., exponential-backoff or constant-delay), plaintext, or RAT/malware-specific features, such as XOR encoding.

At step 1015, as detailed above, the security service may construct a scan message to elicit a type of server response associated with the particular type of RAT. In various embodiments, the scan message may be formed by altering one or more packets of the traffic under scrutiny (e.g., disruptive scanning) or may be generated as a separate message as part of a parallel session with the server (e.g., parallel scanning). In some cases, the service may select between the two scanning strategies based on a measure of confidence in the classification from step 1010. For example, the service may form the scan message by copying HTTP header information, a URI, or the like, captured from the traffic between the endpoint device and the server, into a new message.

At step 1020, the security service may obtain a server response from the server, by sending the constructed scan message to the server, as described in greater detail above. As noted above, C&C servers for different RATs or other malware may have unique response behaviors that can be elicited by the constructed scan message.

At step 1025, as detailed above, the security service may determine whether the endpoint device is infected with the particular type of RAT, by validating whether the server response from the server matches the type of server response associated with the particular type of RAT. If the security service confirms that the endpoint device is indeed infected, the service may then initiate an number of mitigation actions, such as blocking traffic associated with the endpoint device and/or server, sending an alert to a user interface, or the like. Procedure 1000 then ends at step 1030.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, leverage both passive traffic analysis and active scanning, to detect the presence of RATs and other forms of malware in a network.

While there have been shown and described illustrative embodiments that provide for the triggering of targeted scanning to detect RATs and other forms of malware, it is to be understood that various other adaptations and modifications may be made within the spirit and scope of the embodiments herein. For example, while certain embodiments are described herein with respect to using certain models for purposes of passive traffic analysis and/or scan assessment, the models are not limited as such and may be used for other functions, in other embodiments. In addition, while certain protocols are shown, such as TLS, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
classifying, by a security service, traffic telemetry data for traffic between an endpoint device and a server as potentially associated with a particular type of remote access Trojan (RAT);
constructing, by the security service and according to a parallel scanning strategy or a disruptive scanning strategy, a scan message to elicit a type of server response associated with the particular type of RAT, wherein the parallel scanning strategy or the disruptive scanning strategy is selected based on a measure of confidence associated with the classifying of the traffic telemetry data;
obtaining, by the security service, a server response from the server, by sending the constructed scan message to the server; and
determining, by the security service, whether the endpoint device is infected with the particular type of RAT, by validating whether the server response from the server matches the type of server response associated with the particular type of RAT.

2. The method as in claim 1, further comprising:
initiating, by the security service, a mitigation action with respect to the endpoint device, in response to determining that the endpoint device is infected with the particular type of RAT.

3. The method as in claim 1, wherein classifying the traffic telemetry data for the traffic between the endpoint device and the server as potentially associated with the particular type of RAT comprises:
applying a machine learning-based classifier to the traffic telemetry data, wherein the classifier applies a label for the particular type of RAT to the traffic telemetry data from among a plurality of RAT types.

4. The method as in claim 1, wherein constructing the scan message to elicit a type of server response associated with the particular type of RAT comprises:
intercepting a packet sent between the endpoint device and the server; and
altering one or more header fields of the intercepted packet, to form the scan message.

5. The method as in claim 1, wherein constructing the scan message to elicit a type of server response associated with the particular type of RAT comprises:
copying data captured in the traffic telemetry data for the traffic between the endpoint device and the server into a new scan message, wherein the new scan message is sent to the server as a new session.

6. The method as in claim 5, further comprising:
sending a second scan message to the server, to elicit a default response from the server.

7. The method as in claim 5, wherein the copied data comprises at least one of: HyperText Transfer Protocol (HTTP) header information or a Uniform Resource Identifier (URI) captured from the traffic between the endpoint device and the server.

8. The method as in claim 1, wherein classifying the traffic telemetry data for the traffic between the endpoint device and the server as potentially associated with a particular type of RAT comprises:
detecting exponential-backoff polling or constant-delay polling in the traffic between the endpoint device and the server.

9. An apparatus, comprising:
one or more network interfaces to communicate with a network;
a processor coupled to the network interfaces and configured to execute one or more processes; and
a memory configured to store a process executable by the processor, the process when executed configured to:
classify traffic telemetry data for traffic between an endpoint device and a server as potentially associated with a particular type of remote access Trojan (RAT);
construct, according to a parallel scanning strategy or a disruptive scanning strategy, a scan message to elicit a type of server response associated with the particular type of RAT, wherein the parallel scanning strategy or the disruptive scanning strategy is selected based on a measure of confidence associated with the classifying of the traffic telemetry data;
obtain a server response from the server, by sending the constructed scan message to the server; and
determine whether the endpoint device is infected with the particular type of RAT, by validating whether the server response from the server matches the type of server response associated with the particular type of RAT.

10. The apparatus as in claim 9, wherein the process when executed is further configured to:
initiate a mitigation action with respect to the endpoint device, in response to determining that the endpoint device is infected with the particular type of RAT.

11. The apparatus as in claim 9, wherein the apparatus classifies the traffic telemetry data for the traffic between the endpoint device and the server as potentially associated with the particular type of RAT by:
applying a machine learning-based classifier to the traffic telemetry data, wherein the classifier applies a label for the particular type of RAT to the traffic telemetry data from among a plurality of RAT types.

12. The apparatus as in claim 9, wherein the apparatus constructs the scan message to elicit a type of server response associated with the particular type of RAT by:
intercepting a packet sent between the endpoint device and the server; and
altering one or more header fields of the intercepted packet, to form the scan message.

13. The apparatus as in claim 9, wherein the apparatus constructs the scan message to elicit a type of server response associated with the particular type of RAT by:
copying data captured in the traffic telemetry data for the traffic between the endpoint device and the server into a new scan message, wherein the new scan message is sent to the server as a new session.

14. The apparatus as in claim 13, wherein the process when executed is further configured to:
send a second scan message to the server, to elicit a default response from the server.

15. The apparatus as in claim 13, wherein the copied data comprises at least one of: HyperText Transfer Protocol (HTTP) header information or a Uniform Resource Identifier (URI) captured from the traffic between the endpoint device and the server.

16. The apparatus as in claim 9, wherein the apparatus classifies the traffic telemetry data for the traffic between the endpoint device and the server as potentially associated with a particular type of RAT by:
- detecting exponential-backoff polling or constant-delay polling in the traffic between the endpoint device and the server.

17. A tangible, non-transitory, computer-readable medium storing program instructions that cause a security service to execute a process comprising:
- classifying, by the security service, traffic telemetry data for traffic between an endpoint device and a server as potentially associated with a particular type of remote access Trojan (RAT);
- constructing, by the security service and according to a parallel scanning strategy or a disruptive scanning strategy, a scan message to elicit a type of server response associated with the particular type of RAT, wherein the parallel scanning strategy or the disruptive scanning strategy is selected based on a measure of confidence associated with the classifying of the traffic telemetry data;
- obtaining, by the security service, a server response from the server, by sending the constructed scan message to the server; and
- determining, by the security service, whether the endpoint device is infected with the particular type of RAT, by validating whether the server response from the server matches the type of server response associated with the particular type of RAT.

* * * * *